US012757811B2

(12) United States Patent
Suzuki et al.

(10) Patent No.: US 12,757,811 B2
(45) Date of Patent: Oct. 13, 2026

(54) AUTOMATIC TRAVELING METHOD, WORK VEHICLE, AND AUTOMATIC TRAVELING SYSTEM

(71) Applicant: Yanmar Holdings Co., Ltd., Osaka (JP)

(72) Inventors: Hidetaka Suzuki, Okayama (JP); Masaaki Murayama, Okayama (JP); Yuji Yamaguchi, Okayama (JP); Yasuto Nishii, Okayama (JP)

(73) Assignee: Yanmar Holdings Co., Ltd., Osaka (JP)

(*) Notice: Subject to any disclaimer, the term of this patent is extended or adjusted under 35 U.S.C. 154(b) by 323 days.

(21) Appl. No.: 18/104,316

(22) Filed: Feb. 1, 2023

(65) Prior Publication Data

US 2023/0255131 A1 Aug. 17, 2023

(30) Foreign Application Priority Data

Feb. 17, 2022 (JP) ................................ 2022-022971

(51) Int. Cl.

| | |
|---|---|
| ***A01B 69/04*** | (2006.01) |
| ***A01B 79/00*** | (2006.01) |
| ***A01D 75/00*** | (2006.01) |
| ***G05D 1/00*** | (2024.01) |

(52) U.S. Cl.

CPC .......... *A01B 69/008* (2013.01); *A01B 79/005* (2013.01); *A01D 75/00* (2013.01); *G05D 1/0044* (2013.01); *G05D 1/0219* (2013.01)

(58) Field of Classification Search

None

See application file for complete search history.

(56) References Cited

U.S. PATENT DOCUMENTS 5,426,584 A * 6/1995 Kamimura ........... G01C 15/002 356/152.3
2007/0233348 A1* 10/2007 Diekhans ........... A01D 41/1278 701/50
2010/0146438 A1* 6/2010 Bush .................... G06Q 10/109 715/810

(Continued)

FOREIGN PATENT DOCUMENTS

CN 112868369 A * 6/2021 ............. G05D 1/648
CN 113190017 A * 7/2021 ........... G05D 1/0221

(Continued)

*Primary Examiner* — Mahmoud S Ismail
*Assistant Examiner* — Jacob Daniel Underbakke
(74) *Attorney, Agent, or Firm* — Chris Mizumoto

(57) ABSTRACT

A combine harvester includes a control device and a portable terminal. The control device functions as an automatic traveling control unit that performs automatic traveling on the basis of a created automatic traveling route. The portable terminal is provided with a control device, and the control device functions as a route creation unit that creates, when a field outline or an outline of an unworked region is set as a target outline and one side that constitutes the target outline is set as a reference line, the automatic traveling route as a route that is parallel to the reference line. The control device also functions as a reference line setting unit that sets, when one side that constitutes the target outline is equal to or more than a predetermined side length threshold, the one side as the reference line.

11 Claims, 10 Drawing Sheets

(56) References Cited

U.S. PATENT DOCUMENTS

| | | | | |
|---|---|---|---|---|
| 2010/0217516 | A1* | 8/2010 | Diekhans | A01B 69/007 701/533 |
| 2015/0285647 | A1* | 10/2015 | Meyer zu Helligen | G01C 21/3407 701/533 |
| 2017/0202131 | A1* | 7/2017 | Bunderson | B60W 10/04 |
| 2018/0210449 | A1* | 7/2018 | Sakaguchi | A01B 69/008 |
| 2018/0310461 | A1* | 11/2018 | Shinkai | A01B 69/008 |
| 2019/0226867 | A1* | 7/2019 | Gluck | G01C 21/3667 |
| 2020/0064144 | A1* | 2/2020 | Tomita | B62D 6/00 |
| 2020/0363811 | A1* | 11/2020 | Nishii | A01B 69/00 |
| 2021/0003416 | A1* | 1/2021 | Wilson | A01B 69/008 |
| 2021/0302962 | A1* | 9/2021 | Sakaguchi | G05D 1/0212 |
| 2022/0164636 | A1* | 5/2022 | Fadaie | G06N 20/00 |
| 2022/0210971 | A1* | 7/2022 | Edo | A01D 41/1278 |
| 2023/0104274 | A1* | 4/2023 | Umemoto | G05D 1/0044 701/50 |
| 2023/0225237 | A1* | 7/2023 | Morimoto | A01B 69/008 701/50 |

FOREIGN PATENT DOCUMENTS

| | | | | | |
|---|---|---|---|---|---|
| DE | 102017103140 | A1 | * | 8/2018 | |
| DE | 102019201914 | A1 | * | 8/2020 | |
| EP | 3722905 | A1 | | 10/2020 | |
| JP | 2021083387 | A | * | 6/2021 | |
| JP | 2021108621 | A | * | 8/2021 | A01B 69/008 |
| JP | 2021158980 | A | * | 10/2021 | |
| KR | 101879247 | B1 | * | 8/2018 | |
| WO | WO-2021145009 | A1 | * | 7/2021 | A01B 69/008 |
| WO | WO-2022004698 | A1 | * | 1/2022 | G05D 1/43 |

* cited by examiner

AUTOMATIC TRAVELING METHOD, WORK VEHICLE, AND AUTOMATIC TRAVELING SYSTEM

CROSS-REFERENCE

This application claims foreign priority of JP2022-022971 filed Feb. 17, 2022, the disclosure of which is hereby incorporated by reference in its entirety.

TECHNICAL FIELD

The present invention relates to an automatic traveling method, a work vehicle, and an automatic traveling system causing a work vehicle to perform automatic traveling in a field.

BACKGROUND ART

Conventionally, a work vehicle such as a combine harvester is configured to be able to automatically travel along a preset automatic traveling route, for example, to create an automatic traveling route parallel to a straight reference line in a field.

For example, in the automatic traveling system work vehicles disclosed in Patent Document 1, a traveling route generating device that generates a traveling route for a harvester is constructed by an outline data generating unit, an area setting unit, and a route managing unit. A strip route element calculating unit provided in the route managing unit calculates a group of traveling route elements, which are a group of parallel lines that extend parallel to a reference side selected from sides constituting an outline of a work target area and cover the work target area with a working width.

PRIOR ART DOCUMENT

Patent Document

Patent Document 1: Japanese Patent No. 6936356

SUMMARY OF INVENTION

Technical Problem

As described above, when a reference line, which serves as a reference for an automatic traveling route on which a work vehicle travels automatically, is selected from sides that constitute an outline of a field or sides that constitute an outline of a work target area such as an unworked region of the field, a relatively short side included in the outline of the field or the outline of the work target area is sometimes selected as the reference line. In this case, a relatively short automatic traveling route is created on the basis of the relatively short reference line, which may not allow the automatic traveling to proceed smoothly, thereby reducing work efficiency.

In addition, in a case where the work vehicle creates, not on the basis of the reference line, but on the basis of the outline of the field or the outline of the unworked region, an automatic traveling route that connects straight routes and circles around, the route length of the straight route becomes relatively short when approaching the inner side of the field, and the automatic traveling may not proceed smoothly, thereby reducing work efficiency.

An object of the present invention is to provide an automatic traveling method, a work vehicle, and an automatic traveling system that enable to proceed automatic traveling smoothly without creating a short automatic traveling route.

Solution to Problem

To solve the above problem, the automatic traveling method of the present invention is an automatic traveling method causing a work vehicle to perform automatic traveling in a field, the automatic traveling method comprising: a route creating step of creating, when a field outline is set as a target outline and one side that constitutes the target outline is set as a reference line, a route that is parallel to the reference line; an automatic traveling step of performing automatic traveling on the basis of the created route; and a reference line setting step of setting, when one side that constitutes the target outline is equal to or more than a predetermined side length threshold, the one side as the reference line.

Alternatively, the automatic traveling method of the present invention is an automatic traveling method causing a work vehicle to perform automatic traveling in a field, the automatic traveling method comprising: a route creating step of creating, when an outline of an unworked region of the field is set as a target outline and one side that constitutes the target outline is set as a reference line, a route that is parallel to the reference line; an automatic traveling step of performing automatic traveling on the basis of the created route; and a reference line setting step of setting, when one side that constitutes the target outline is equal to or more than a predetermined side length threshold, the one side as the reference line.

Alternatively, the automatic traveling method of the present invention is an automatic traveling method causing a work vehicle to perform automatic traveling in a field, the automatic traveling method comprising: a route creating step of creating a route on the basis of a field outline or an outline of an unworked region of the field; and an automatic traveling step of performing automatic traveling on the basis of the created route, and wherein the route creating step creates only the route whose route length is equal to or more than a predetermined lower limit route length.

In addition, to solve the above problem, the work vehicle of the present invention is a work vehicle that performs automatic traveling in a field, the work vehicle comprising: a route creation unit creating, when a field outline is set as a target outline and one side that constitutes the target outline is set as a reference line, a route that is parallel to the reference line; an automatic traveling control unit performing automatic traveling on the basis of the created route; and a reference line setting unit setting, when one side that constitutes the target outline is equal to or more than a predetermined side length threshold, the one side as the reference line.

Alternatively, the work vehicle of the present invention is a work vehicle that performs automatic traveling in a field, the work vehicle comprising: a route creation unit creating, when an outline of an unworked region of the field is set as a target outline and one side that constitutes the target outline is set as a reference line, a route that is parallel to the reference line; an automatic traveling control unit performing automatic traveling on the basis of the created route; and a reference line setting unit setting, when one side that constitutes the target outline is equal to or more than a predetermined side length threshold, the one side as the reference line.

Alternatively, the work vehicle of the present invention is a work vehicle that performs automatic traveling in a field, the work vehicle comprising: a route creation unit creating a route on the basis of a field outline or an outline of an unworked region of the field; and an automatic traveling control unit performing automatic traveling on the basis of the created route, and wherein the route creation unit creates only the route whose route length is equal to or more than a predetermined lower limit route length.

In addition, to solve the above problem, the automatic traveling system of the present invention is an automatic traveling system causing a work vehicle to perform automatic traveling in a field, the automatic traveling system comprising: a route creation unit creating, when a field outline is set as a target outline and one side that constitutes the target outline is set as a reference line, a route that is parallel to the reference line; an automatic traveling control unit performing automatic traveling on the basis of the created route; and a reference line setting unit setting, when one side that constitutes the target outline is equal to or more than a predetermined side length threshold, the one side as the reference line.

Alternatively, the automatic traveling system of the present invention is an automatic traveling system causing a work vehicle to perform automatic traveling in a field, the automatic traveling system comprising: a route creation unit creating, when an outline of an unworked region of the field is set as a target outline and one side that constitutes the target outline is set as a reference line, a route that is parallel to the reference line; an automatic traveling control unit performing automatic traveling on the basis of the created route; and a reference line setting unit setting, when one side that constitutes the target outline is equal to or more than a predetermined side length threshold, the one side as the reference line.

Alternatively, the automatic traveling system of the present invention is an automatic traveling system causing a work vehicle to perform automatic traveling in a field, the automatic traveling system comprising: a route creation unit creating a route on the basis of a field outline or an outline of an unworked region of the field; and an automatic traveling control unit performing automatic traveling on the basis of the created route, and wherein the route creation unit creates only the route whose route length is equal to or more than a predetermined lower limit route length.

Advantageous Effects of Invention

The present invention provides an automatic traveling method, a work vehicle, and an automatic traveling system that enable to proceed automatic traveling smoothly without creating a short automatic traveling route.

DESCRIPTION OF EMBODIMENTS

As an example of a work vehicle according to an embodiment of the present invention, a combine harvester 1 will be described with reference to FIG. 1, etc. The combine harvester 1 travels in a field as a target to be worked by automatic driving or manual operation, and performs work such as reaping for performing harvest work of crops from grain culms planted in the field. The combine harvester 1 is, for example, configured to perform automatic work in which steering is controlled by automatic driving while traveling speed is controlled in response to manual operation, or unmanned work in which the steering and the traveling speed are controlled by automatic driving, and can travel, turn, and work autonomously in a field.

While traveling on straight rows, a predetermined number of which within the reaping possible row number is a reaping width, relative to a plurality of rows of grain culms, the combine harvester 1 performs reaping work for the straight rows. In the combine harvester 1, a traveling mode, either a manual traveling mode or an automatic traveling mode, is set. The combine harvester 1 is so configured as to perform, when being set to the manual traveling mode, the manual traveling according to steering of a steering part 9 by a worker.

Meanwhile, the combine harvester 1 is so configured as to perform, when being set to the automatic traveling mode, automatic straight traveling, in which the combine harvester 1 automatically reaps while traveling automatically along an automatic traveling route parallel to a reference line set in a field. For example, when performing automatic straight traveling, the combine harvester 1 may set an outline of a field as a target outline and one side that constitutes the target outline as a reference line, or the combine harvester 1 may set an outline of an unworked region in a field as a target outline and one side that constitutes the target outline as a reference line.

Figure 1:
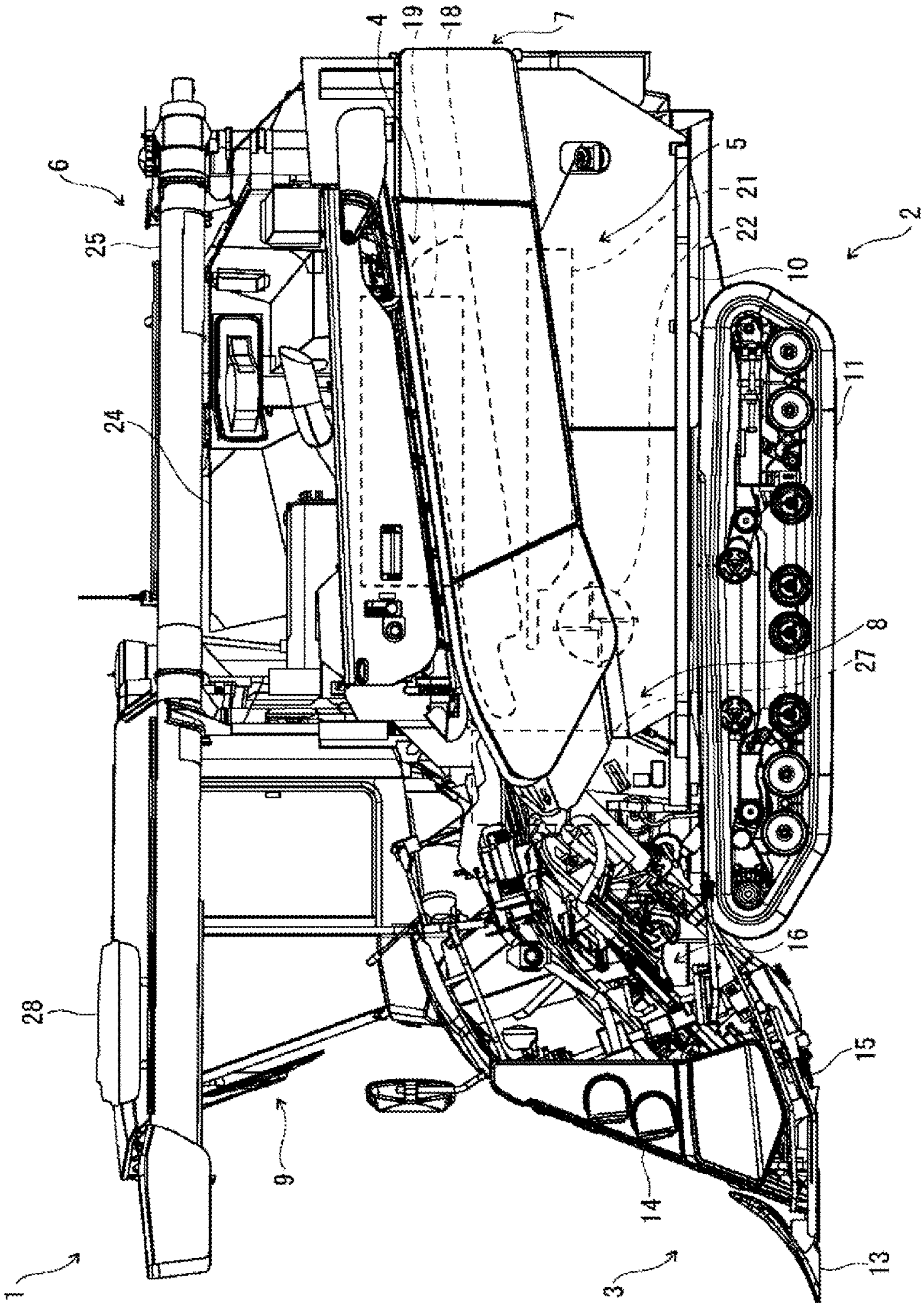
FIG. 1 is a side view of a combine harvester according to an embodiment of the present invention.

As illustrated in FIG. 1, the combine harvester 1 includes a traveling part 2, a reaping part 3, a threshing part 4, a sorting part 5, a storage part 6, a discharged straw processing part 7, a power part 8, and the steering part 9, and is composed of a so-called head-feeding type combine harvester. The combine harvester 1 travels by the traveling part 2, threshes grain culms reaped by the reaping part 3 in the threshing part 4, sorts the grain in the sorting part 5, and stores the grain in the storage part 6. The combine harvester 1 causes the discharged straw processing part 7 to process the threshed discharged straw. The combine harvester 1 drives the traveling part 2, the reaping part 3, the threshing part 4, the sorting part 5, the storage part 6, and the discharged straw processing part 7 with power supplied by the power part 8.

The traveling part 2 is provided below a machine body frame 10, and includes a left-and-right pair of crawler type traveling devices 11, and a transmission (not illustrated). The traveling part 2 causes the combine harvester 1 to travel in the front-rear direction, or causes the combine harvester 1 to turn in the left-right direction by rotating crawlers of the crawler type traveling devices 11 with power (for example, rotational power) transmitted from an engine 27 of the power part 8. The transmission transmits the power (rotational power) of the power part 8 to the crawler type traveling devices 11, and is capable of shifting the rotational power.

The reaping part 3 is provided in front of the traveling part 2, and performs reaping work for the rows within the reaping possible row number. The reaping part 3 includes a divider 13, a raising device 14, a cutting device 15, and a conveying device 16. The divider 13 divides the grain culms in the field for each row, and guides, to the raising device 14, the grain culms for the predetermined number of rows within the reaping possible row number. The raising device 14 raises the grain culms guided by the divider 13. The cutting device 15 cuts the grain culms raised by the raising device 14. The conveying device 16 conveys the grain culms cut by the cutting device 15 to the threshing part 4.

The threshing part 4 is provided behind the reaping part 3. The threshing part 4 includes a feed chain 18, and a threshing cylinder 19. The feed chain 18 conveys, for threshing, the grain culms conveyed from the conveying device 16 of the reaping part 3, and further conveys the grain culms after threshing, that is, discharged straw to the discharged straw processing part 7. The threshing cylinder 19 threshes the grain culms conveyed by the feed chain 18.

The sorting part 5 is provided below the threshing part 4. The sorting part 5 includes a swing sorting device 21, a blower sorting device 22, a grain conveying device (not illustrated), and a straw dust discharging device (not illustrated). The swing sorting device 21 sifts the threshed grain that falls from the threshing part 4 and sorts the threshed grain into grain, straw dust, and the like. The blower sorting device 22 further sorts the threshed grain sorted by the swing sorting device 21 into grain, straw dust, and the like by air blow. The grain conveying device conveys the grain sorted by the swing sorting device 21 and the blower sorting device 22 to the storage part 6. The straw dust discharging device discharges the straw dust and the like sorted by the swing sorting device 21 and the blower sorting device 22 to the outside of the combine harvester.

The storage part 6 is provided on the right side of the threshing part 4. The storage part 6 includes a grain tank 24, and a discharging device 25. The grain tank 24 stores the grain conveyed from the sorting part 5. The discharging device 25 is composed of an auger or the like, and discharges the grain stored in the grain tank 24 to any place.

The discharged straw processing part 7 is provided behind the threshing part 4. The discharged straw processing part 7 includes a discharged straw conveying device (not illustrated), and a discharged straw cutting device (not illustrated). The discharged straw conveying device conveys the discharged straw conveyed from the feed chain 18 of the threshing part 4 to the discharged straw cutting device. The discharged straw cutting device cuts the discharged straw conveyed by the discharged straw conveying device, and discharges the cut discharged straw to the outside of the combine harvester.

The power part 8 is provided above the traveling part 2 and in front of the storage part 6. The power part 8 includes the engine 27 that generates rotational power. The power part 8 transmits the rotational power generated by the engine 27 to the traveling part 2, the reaping part 3, the threshing part 4, the sorting part 5, the storage part 6, and the discharged straw processing part 7.

The steering part 9 is provided above the power part 8. The steering part 9 includes, around a driver's seat which is a seat on which a worker sits, as operation tools for steering the traveling of the combine harvester 1, a steering wheel for instructing turning of the machine body of the combine harvester 1, a main shift lever and a sub-shift lever for instructing change of the forward and backward speed of the combine harvester 1. The manual traveling of the combine harvester 1 is performed by the traveling part 2 that accepts operations of the steering wheel 29, the main shift lever, and the sub-shift lever of the steering part 9. The steering part 9 includes a mechanism for operating the reaping work by the reaping part 3, the threshing work by the threshing part 4, the discharging work by the discharging device 25 of the storage part 6, and other work.

The combine harvester 1 includes a positioning unit 28 that acquires an own vehicle position of the combine harvester 1 by using a satellite positioning system such as a GPS. The positioning unit 28 receives a positioning signal from a positioning satellite via a positioning antenna, and acquires position information of the positioning unit 28, that is, the own vehicle position of the combine harvester 1 on the basis of the positioning signal.

Next, a control device 30 of the combine harvester 1 will be described with reference to FIG. 2. The control device 30 is composed of a computer such as a CPU, and is connected to a memory unit 31 such as a ROM, a RAM, a hard disk drive, and a flash memory, and to a communication unit 32 that communicates with an external instrument.

The memory unit 31 stores a program and data for controlling various types of constituent components and various types of functions of the combine harvester 1, and the control device 30 executes an arithmetic process on the basis of the program and the data stored in the memory unit 31, so that the various types of constituent components and the various types of functions are controlled. The control device 30, for example, acquires the own vehicle position of the combine harvester 1 from the positioning unit 28 and also acquires a traveling direction at the own vehicle position of the combine harvester 1.

The communication unit 32 is capable of wirelessly communicating with an external device such as a portable terminal 40 owned by the worker via a wireless communication antenna. The control device 30 controls the communication unit 32 thereby to execute the wireless communication with the portable terminal 40, and sends and receives various information to and from the portable terminal 40.

The control device 30 operates as an automatic traveling control unit 35 by executing the program stored in the memory unit 31. The automatic traveling control unit 35 realizes an automatic traveling step of the automatic traveling method according to the present invention.

The automatic traveling control unit 35 controls, when being set to an automatic traveling mode, the automatic traveling of the combine harvester 1 based on a route created for a field. For example, the automatic traveling control unit 35 controls automatic straight traveling of the combine harvester 1, in which the combine harvester 1 automatically reaps while traveling automatically along an automatic traveling route created on the basis of a reference line set in a field. Specifically, the automatic traveling control unit 35 acquires, from the portable terminal 40, field information, a reference line, and an automatic traveling route that are set for the field. When the automatic straight traveling is started, the automatic traveling control unit 35 acquires the own vehicle position of the combine harvester 1 from the positioning unit 28, and controls the power part 8, the traveling part 2, and the reaping part 3 such that the combine harvester 1 performs the automatic straight traveling along the automatic traveling route on the basis of the own vehicle position and the automatic traveling route.

The portable terminal 40 is one of the constituent components of the combine harvester 1, is a terminal that can remotely operate the combine harvester 1, and is composed of, for example, a tablet terminal equipped with a touch panel, a laptop personal computer, or the like. An operation device similar to the portable terminal 40 may be provided in the steering part 9. In the present invention, the automatic traveling system is constituted by the combine harvester 1 and the portable terminal 40.

Figure 2:
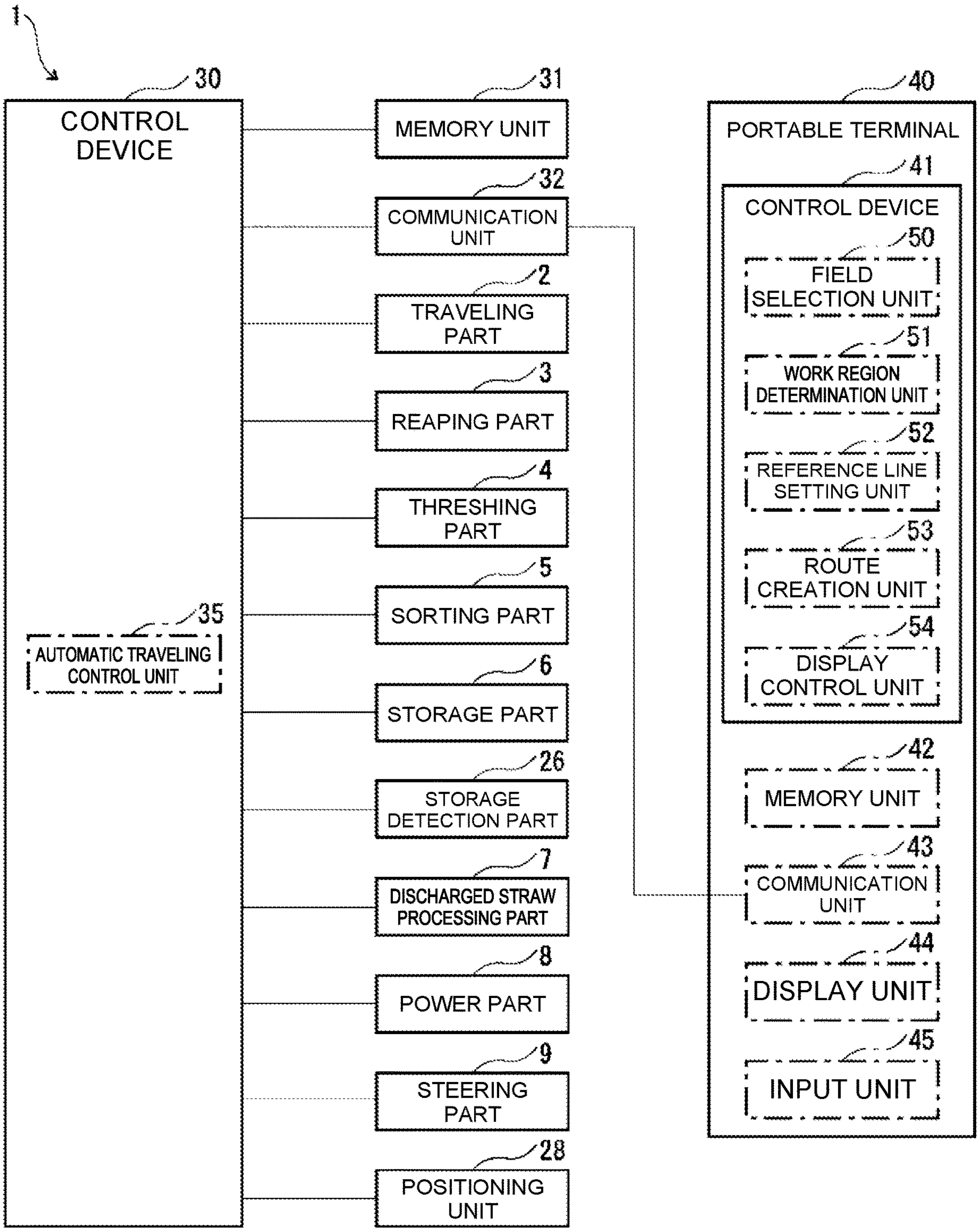
FIG. 2 is a block diagram of the combine harvester according to the embodiment of the present invention.

As illustrated in FIG. 2, the portable terminal 40 includes a control device 41 composed of a computer such as a CPU, and the control device 41 is connected to a memory unit 42 such as a ROM, a RAM, a hard disk drive and a flash memory, and to a communication unit 43 that communicates with an external instrument. Further, the portable terminal 40 includes a display unit 44, such as a touch panel and a monitor for displaying various information and outputting the various information to the worker, and also includes an input unit 45 such as a touch panel and an operation key for receiving an input operation of various information from the worker.

The memory unit 42 stores a program and data for controlling various types of constituent components and various types of functions of the portable terminal 40, and the control device 41 executes an arithmetic process on the basis of the program and the data stored in the memory unit 42, so that the various types of constituent components and the various types of functions of the portable terminal 40 are controlled. The memory unit 42 stores field information, a reference line, and an automatic traveling route of a field that is a target to be worked by the combine harvester 1.

Figure 3:
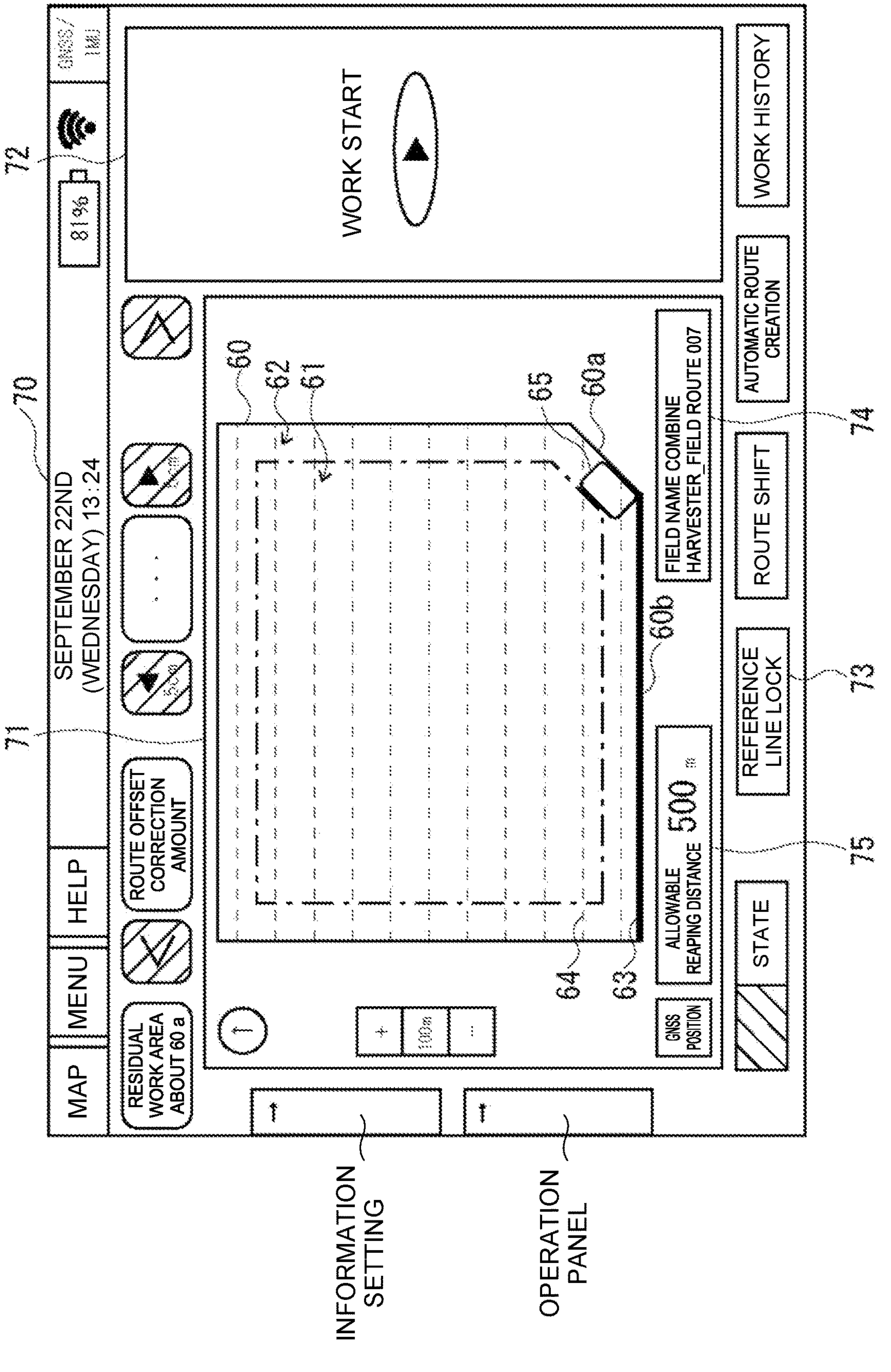
FIG. 3 is a plan view illustrating an example of a work screen displayed on a portable terminal of the combine harvester according to the embodiment of the present invention.
Figure 4:
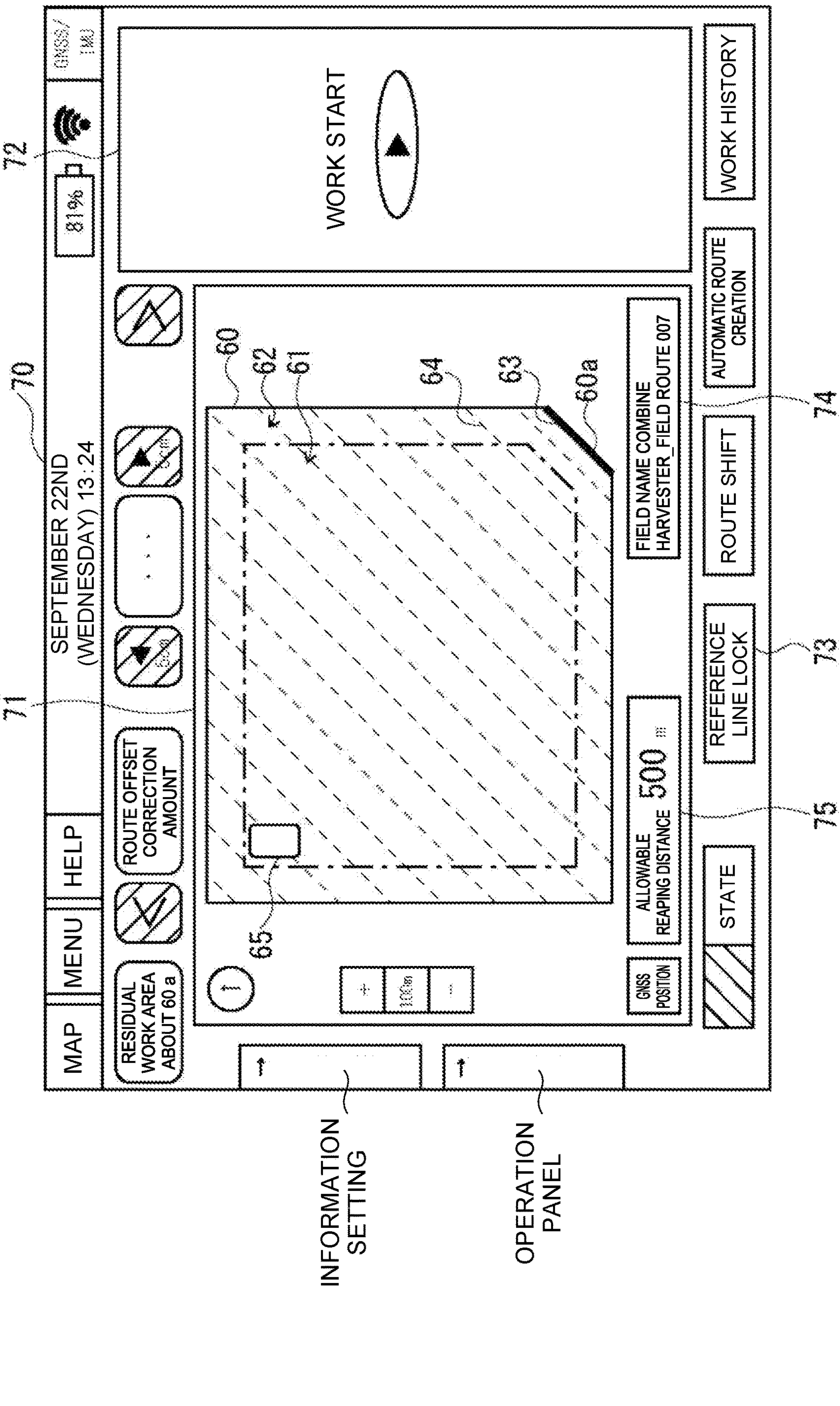
FIG. 4 is a plan view illustrating an example of the work screen displayed on the portable terminal of the combine harvester according to the embodiment of the present invention.

For example, as illustrated in FIGS. 3 and 4, a field has, within a field outline 60 that has a shape along the outer periphery of the field, an unworked region 61 in which reaping or other work has not yet been performed and an already worked region 62 in which work has already been completed. A reference line 63 is set for performing automatic straight traveling to the field, and an automatic traveling route 64 consisting of a plurality of straight routes parallel to the reference line 63 is created at intervals of the combine harvester 1's working width. In FIGS. 3 and 4, a work screen 70 is shown, which displays the field outline 60, the unworked region 61, the already worked region 62, the reference line 63, and the automatic traveling route 64. The reference line 63 is illustrated with a bold line, and the automatic traveling route 64 is illustrated with a dashed line. The field information includes, for example, the shape, size, and position information (coordinates, etc.) of the field outline 60, the shape, size, and position information (coordinates, etc.) of the unworked region 61 and the already worked region 62.

The communication unit 43 is communicatively connected to the communication unit 32 of the combine harvester 1 via a wireless communication antenna. The control device 41 controls the communication unit 43 thereby to perform a wireless communication with the combine harvester 1, and sends and receives various information to and from the combine harvester 1.

The control device 41 of the portable terminal 40 operates as a field selection unit 50, a work region determination unit 51, a reference line setting unit 52, a route creation unit 53 and a display control unit 54 by executing the program stored in the memory unit 42. The field selection unit 50, the work region determination unit 51, the reference line setting unit 52, the route creation unit 53, and the display control unit 54 realize a field selecting step, a work region determining step, a reference line setting step, a route creating step, and a displaying step, respectively, of the automatic traveling method according to the present invention.

The field selection unit 50 manually or automatically selects a field that is a target to be worked by automatic traveling, sets the outer peripheral shape of the field, that is, the field outline 60, and stores the outer peripheral shape of the field in the memory unit 42. For example, the field selection unit 50 displays a field selection screen (not illustrated) on the display unit 44 for selecting a field to be worked. When the field information including the field outline 60 is already stored in the memory unit 42, the field selection screen makes it possible to select a field corresponding to the field information. When any field is selected on the field selection screen in response to manual operation, the field selection unit 50 selects the selected and operated field as a work target and reads the field information corresponding to the selected field from the memory unit 42.

The field selection screen also makes it possible to operate creation of a new field. When creation of a new field is operated on the field selection screen, the field selection unit 50 selects a new field at the own vehicle position of the combine harvester 1 as a work target. When the combine harvester 1 performs outer periphery reaping traveling while circling along the outer peripheral shape of the new field, the field selection unit 50 receives, from the combine harvester 1, the own vehicle position of the combine harvester 1 positioned by the positioning unit 28 of the combine harvester 1, and records the position information of the outer peripheral shape of the new field or the position information of the route of the outer periphery reaping traveling. The field selection unit 50 creates the field outline 60 of the new field on the basis of the position information obtained by the outer periphery reaping traveling, and creates field information including the field outline 60, and stores the field information in the memory unit 42.

The work region determination unit 51 determines the unworked region 61 and the already worked region 62 in the field, and on the basis of the result of the determination, stores the information on the unworked region 61 and the already worked region 62 in the memory unit 42 as the field information. Before work on the field begins, the unworked region 61 is set over the entire field and the already worked region 62 is not set. While the combine harvester 1 performs reaping traveling in the field regardless of manual traveling or automatic traveling, the work region determination unit 51 records a traveling track of the reaping traveling performed in the field on the basis of the own vehicle position of the combine harvester 1, and sequentially records and updates the area based on the traveling track of the reaping traveling and the working width of the combine harvester 1 as the already worked region 62, and deletes the area set as the already worked region 62 from the unworked region 61 to make an update.

The reference line setting unit 52 sets the reference line 63 that serves as a reference for the automatic traveling route 64 along which the combine harvester 1 performs automatic straight traveling in the field. The reference line setting unit 52 sets the field outline 60 of the field as the target outline and sets one side among a plurality of sides constituting this target outline as the reference line 63, or sets the outline of the unworked region 61 of the field as the target outline and sets one side among a plurality of sides constituting this target outline as the reference line 63.

The reference line setting unit 52 may preset the field outline 60 or the outline of the unworked region 61 as the target outline for setting the reference line 63, or it may be arbitrarily selectable according to the worker's selection operation. Alternatively, the reference line setting unit 52 may be able to automatically switch between the field outline 60 or the outline of the unworked region 61 as the target outline for setting the reference line 63, depending on the work state of the field. For example, the reference line setting unit 52 may set the field outline 60 as the target outline when automatic straight traveling is performed for outer reaping traveling to form a headland along the field outline 60 of the field, and may set the outline of the unworked region 61 as the target outline when automatic straight traveling is performed for the unworked region 61 after the headland is formed.

For example, the reference line setting unit 52 automatically selects one side from a plurality of sides constituting the target outline on the basis of the own vehicle position and the traveling direction of the combine harvester 1, and sets the one side as the reference line 63. In this case, the reference line setting unit 52 may set one side that is located closer to the own vehicle position and has an extending direction closer to the traveling direction as the reference line 63.

In this embodiment, in particular, the reference line setting unit 52 sets, only when one side selected from a plurality of sides constituting the target outline on the basis of the own vehicle position and the traveling direction is equal to or more than a predetermined side length threshold, the one side as the reference line 63. When one side selected as a first candidate on the basis of the own vehicle position and the traveling direction is equal to or more than the side length threshold, the reference line setting unit 52 sets the one side of the first candidate as the reference line 63. On the other hand, when the one side of the first candidate is less than the side length threshold, the reference line setting unit 52 does not set the one side of the first candidate as the reference line 63 but sets one side selected as a second candidate on the basis of the own vehicle position and the traveling direction as the reference line 63.

For example, when the field outline 60 is set as the target outline, as illustrated in FIG. 3, in a case where the own vehicle position of the combine harvester 1 is closer to a side 60*a* of the field outline 60 and the traveling direction of the combine harvester 1 is closer to the extending direction of the side 60*a*, the reference line setting unit 52 selects the side 60*a* as a first candidate on the basis of the own vehicle position and the traveling direction. However, when the side 60*a* is less than a predetermined side length threshold, the reference line setting unit 52 does not set the side 60*a* of the first candidate as the reference line 63. When the own vehicle position of the combine harvester 1 is next closer to a side 60*b* of the field outline 60 and the traveling direction of the combine harvester 1 is next closer to the extending direction of the side 60*b*, the reference line setting unit 52 selects the side 60*b* as a second candidate on the basis of the own vehicle position and the traveling direction. In this case, when the side 60*b* is equal to or more than the predetermined side length threshold, the reference line setting unit 52 sets the side 60*b* of the second candidate as the reference line 63.

Alternatively, when one side is selected from a plurality of sides constituting the target outline in response to a manual locking operation by a worker, the reference line setting unit 52 sets the one side selected by the locking operation as the reference line 63, regardless of the own vehicle position and the traveling direction of the combine harvester 1. In this case, the reference line setting unit 52 sets the one side as the reference line 63 regardless of the own vehicle position and the traveling direction of the combine harvester 1, and regardless of whether or not the one side selected by the locking operation is equal to or more than the predetermined side length threshold.

For example, when the field outline 60 is set as the target outline, as illustrated in FIG. 4, even in a case where the own vehicle position of the combine harvester 1 is far from the side 60*a* of the field outline 60 and the traveling direction of the combine harvester 1 is different from the extending direction of the side 60*a*, and the side length of the side 60*a* is less than the predetermined side length threshold, the reference line setting unit 52 sets, when the locking operation for the side 60*a* is performed, the side 60*a* as the reference line 63.

The predetermined side length threshold may be set in advance or may be set arbitrarily according to the worker's setting operation. The reference line setting unit 52 realizes a threshold setting step of setting a predetermined side length threshold in the automatic traveling method according to the present invention.

When the reference line 63 is set by the reference line setting unit 52, the route creation unit 53 creates the automatic traveling route 64 based on the reference line 63, stores the automatic traveling route 64 in the memory unit 42, and sends the automatic traveling route 64 to the combine harvester 1 via the communication unit 32. For example, the route creation unit 53 creates, over the entire area of the field, the automatic traveling route 64 consisting of a plurality of straight routes that are straight lines parallel to the set reference line 63 and arranged at intervals of the combine harvester 1's working width from the reference line 63. Alternatively, the route creation unit 53 creates, over the entire area of the field, the automatic traveling route 64 consisting of a straight route that is a straight line parallel to the set reference line 63 and passes through the own vehicle position of the combine harvester 1 and a plurality of straight routes that are straight lines parallel to the set reference line 63 and arranged at intervals of the combine harvester 1's working width from the straight route. When the reference line 63 is changed and set in response to a change in the own vehicle position or the traveling direction of the combine harvester 1 or a manual locking operation by the worker, the route creation unit 53 changes and creates the automatic traveling route 64 on the basis of the changed reference line 63.

When the automatic traveling mode is set, the display control unit 54 controls the display unit 44 to show the work screen 70 for performing automatic straight traveling in the field that is a target to be worked, as illustrated in FIGS. 3 and 4. On the work screen 70, the display control unit 54 displays at least a map field 71, as well as a work start button 72 and a reference line lock button 73, which are operable. In addition, on the work screen 70, the display control unit 54 displays a field registration name 74 that is based on the field information, and an allowable reaping distance 75 that is based on the vacant capacity of the grain tank 24 in which the combine harvester 1 stores grain.

The display control unit 54 displays, in the map field 71, the field outline 60 on the map on the basis of the field information of the field selected by the field selection unit 50. In addition, the display control unit 54 displays, in the map field 71, an own vehicle marker 65 of the combine harvester 1 at the own vehicle position of the combine harvester 1 positioned by the positioning unit 28 of the combine harvester 1. The display control unit 54 distinguishably displays the unworked region 61 and the already worked region 62 within the range of the field outline 60. In other words, in the map field 71, the display control unit 54 displays the field outline 60, the unworked region 61, and the already worked region 62 in a distinguishable manner by changing the display method such as line type, line color, and background color. In addition, the display control unit 54 updates the position of the own vehicle marker 65, the range of the unworked region 61, and the range of the already worked region 62 according to the progress of the reaping traveling of the combine harvester 1.

When the reference line 63 is set by the reference line setting unit 52, the display control unit 54 distinguishably displays in the map field 71 of the work screen 70 that the field outline 60 or the outline of the unworked region 61 is the target outline for setting the reference line 63, by changing the display method such as line type and line color from other items. In addition, in the map field 71, the display control unit 54 distinguishably displays, among the sides constituting the target outline, a side that is equal to or more than a predetermined side length threshold and a side that is less than the predetermined side length threshold in a different display method (e.g., line type, line color, etc.). Furthermore, as illustrated in FIG. 7, the display control unit 54 displays, in vicinity of each side in the map field 71, the lengths of the sides constituting the target outline by means of text notation or other means.

Figure 5:
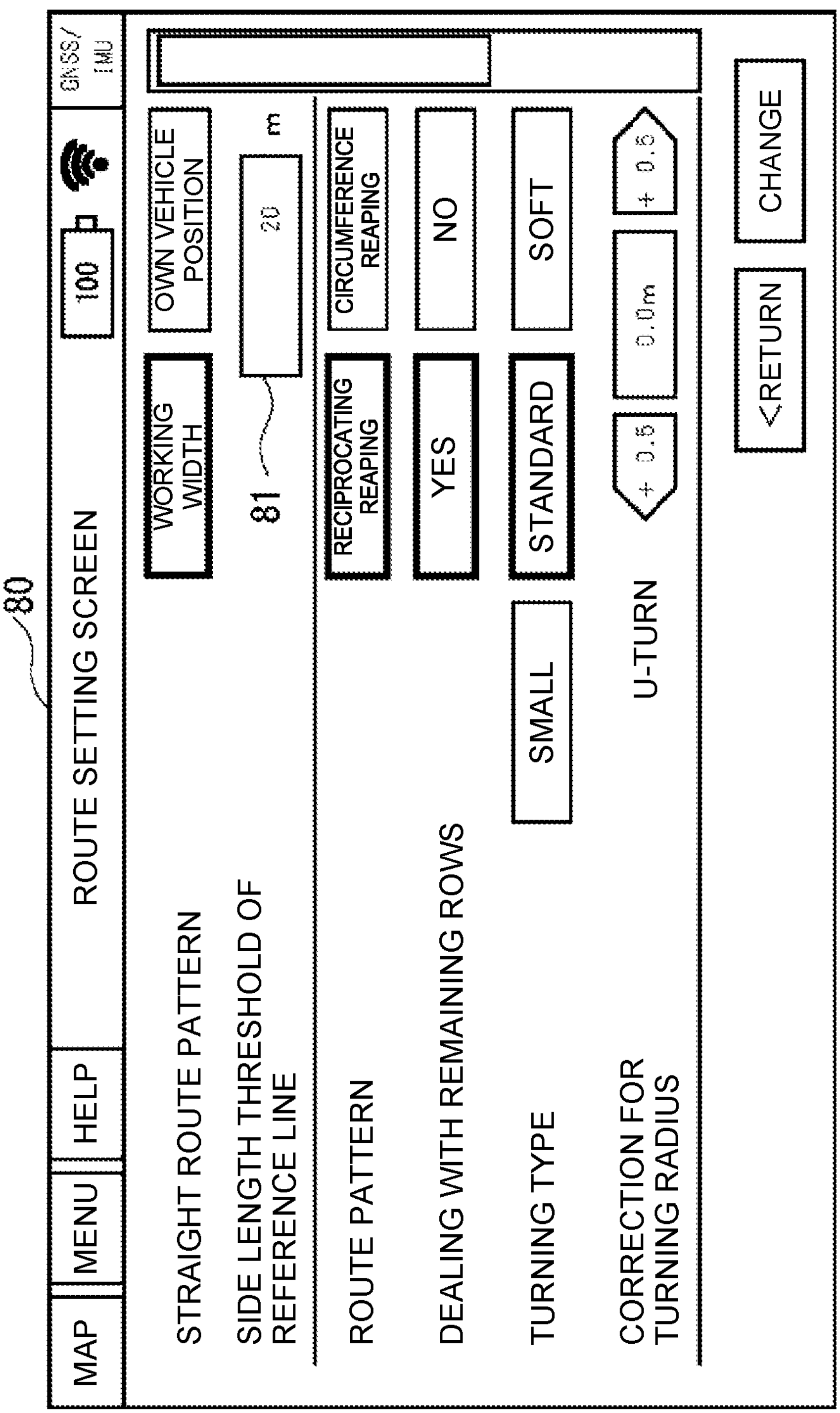
FIG. 5 is a plan view illustrating an example of a route setting screen displayed on the portable terminal of the combine harvester according to the embodiment of the present invention.
Figure 6:
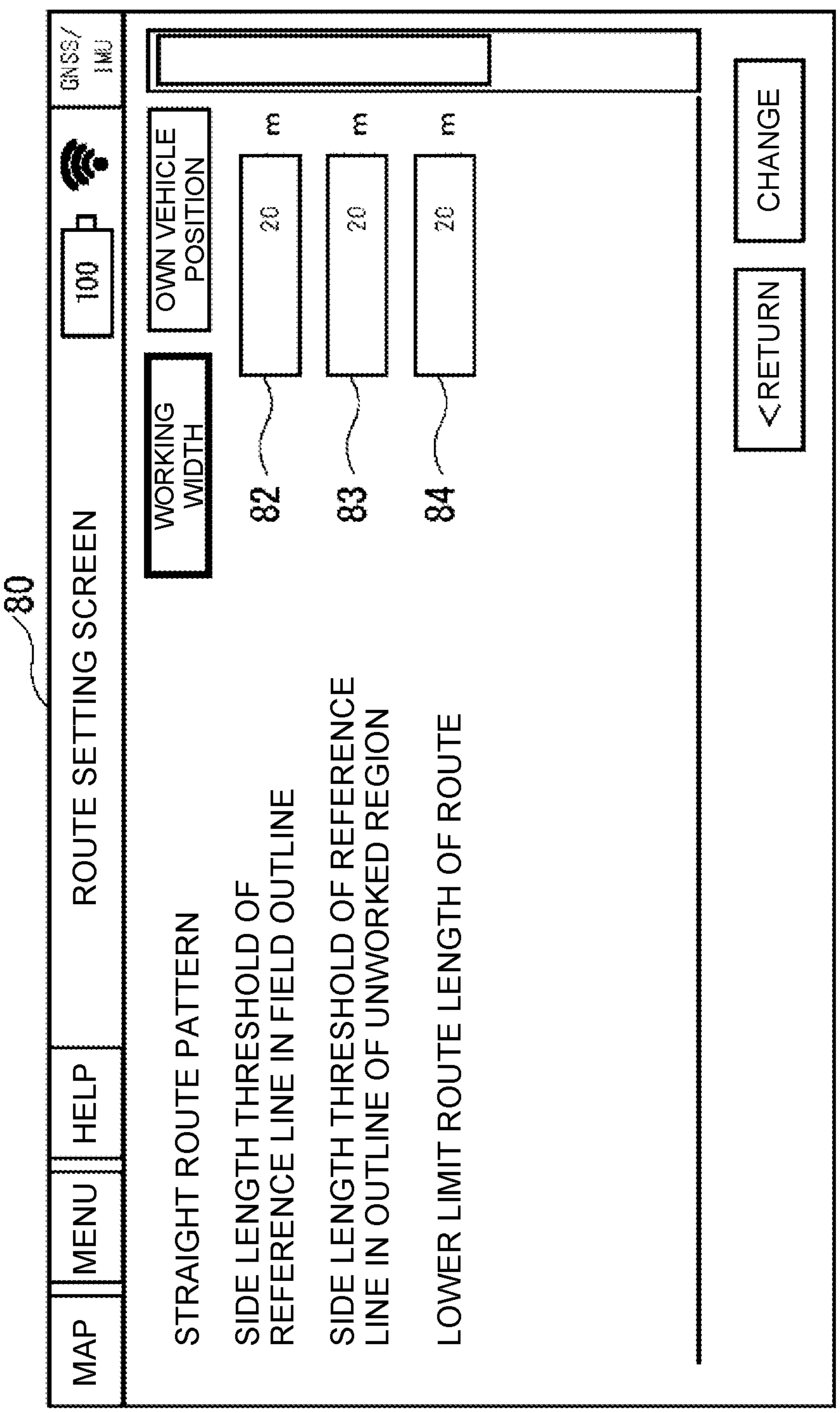
FIG. 6 is a plan view illustrating an example of the route setting screen displayed on the portable terminal of the combine harvester according to the embodiment of the present invention.

The display control unit 54 also allows a predetermined side length threshold to be set and operated on a route setting screen 80 (see FIG. 5 or FIG. 6) related to creation of the automatic traveling route 64 or on the work screen 70. For example, as illustrated in FIG. 5, the display control unit 54 displays, on the route setting screen 80, an input field 81 that allows a side length threshold to be input and set, regardless of whether the target outline is the field outline 60 or the outline of the unworked region 61. Alternatively, as illustrated in FIG. 6, the display control unit 54 displays, on the route setting screen 80, an input field 82 that allows a side length threshold to be input and set when the field outline 60 is set as the target outline, and an input field 83 that allows a side length threshold to be input and set when the outline of the unworked region 61 is set as the target outline. On the route setting screen 80, the display control unit 54 may display an input field 84 that allows a lower limit route length to be input and set when the automatic traveling route 64 is created on the basis of the reference line 63.

Figure 7:
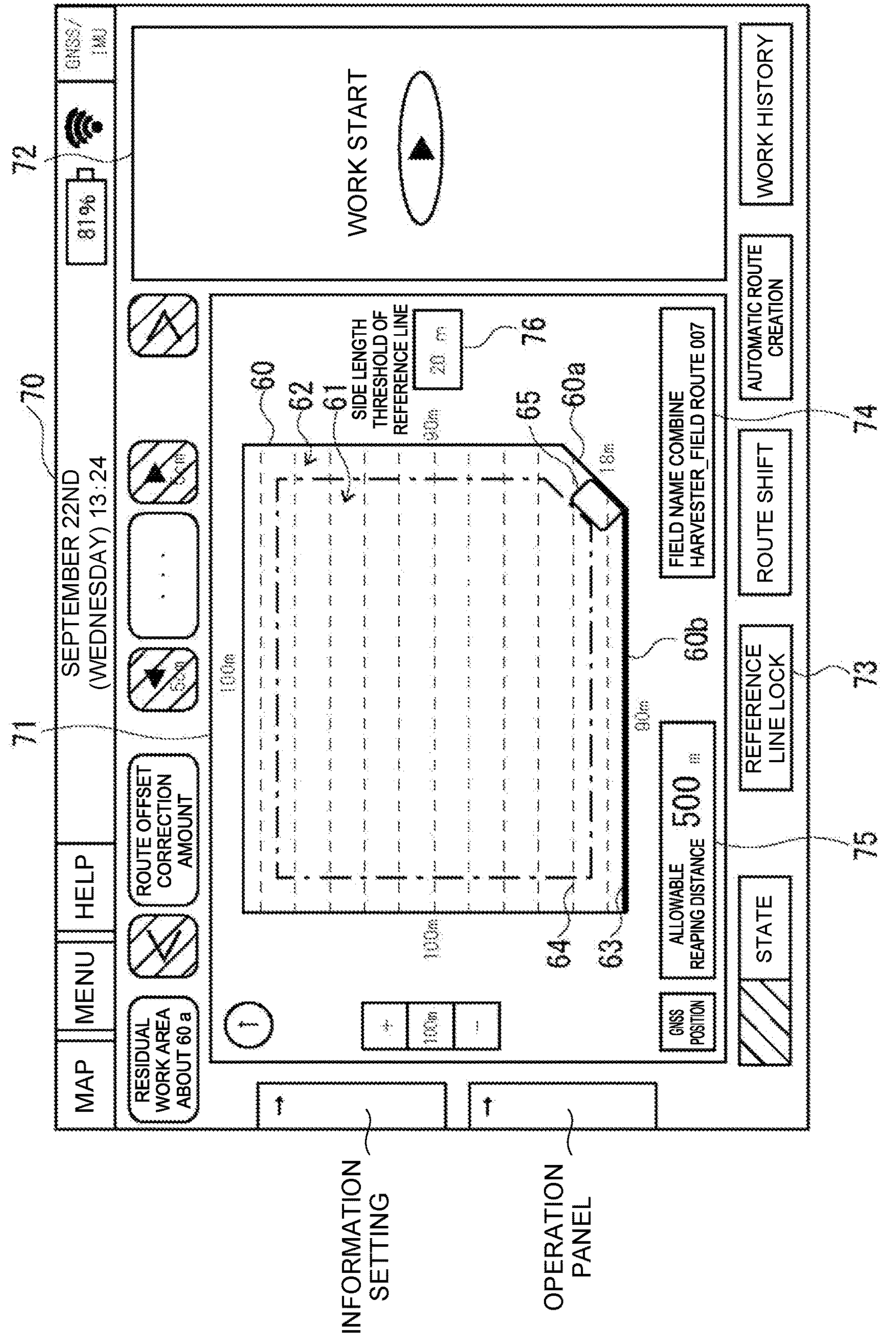
FIG. 7 is a plan view illustrating an example of the work screen displayed on the portable terminal of the combine harvester according to the embodiment of the present invention.

Alternatively, as illustrated in FIG. 7, the display control unit 54 displays, inside or outside the frame of the map field 71 on the work screen 70, an input field 76 that allows a side length threshold to be input and set when the field outline 60 or the outline of the unworked region 61 is set as the target outline. In other words, the display control unit 54 displays, on the same screen by means of the work screen 70, the lengths of the sides comprising the target outline and the input field 76 for inputting a side length threshold.

In a case where the reference line 63 is set when a side of the target outline is equal to or more than a predetermined side length threshold, if the side length threshold is changed in response to the setting operation, the reference line setting unit 52 determines again whether or not the side of the target outline is equal to or more than the predetermined side length threshold, and if necessary, may change and set the reference line 63 according to the result of the determination.

When one side that serves as the reference line 63 is automatically selected by the reference line setting unit 52 on the basis of the own vehicle position and the traveling direction of the combine harvester 1, the display control unit 54 distinguishably displays, in the map field 71, the automatically selected one side that serves as the reference line 63 from the other sides.

When the reference line 63 is selected in the map field 71 by a manual locking operation, the display control unit 54 allows, as each of the sides constituting the target outline for setting the reference line 63, each of the sides constituting the field outline 60 or the outline of the unworked region 61 to be selected and operated. When the reference line lock button 73 is selected and operated in a state where one side of the target outline is selected and operated, the display control unit 54 accepts a locking operation to set the one side as the reference line 63. In this case, the reference line setting unit 52 sets the one side as the reference line 63, regardless of the own vehicle position and the traveling direction of the combine harvester 1, and regardless of whether or not the one side is equal to or more than the predetermined side length threshold. In the map field 71, the display control unit 54 distinguishably displays the one side that serves as the reference line 63 set in response to the locking operation and the other sides.

When the automatic traveling route 64 is created by the route creation unit 53 on the basis of the reference line 63 set by the reference line setting unit 52, the display control unit 54 displays the created automatic traveling route 64 in the map field 71 of the work screen 70. When the reference line 63 is changed in response to a change in the own vehicle position or the traveling direction of the combine harvester 1 or a manual locking operation by the worker, and if the automatic traveling route 64 is changed on the basis of the changed reference line 63, the display control unit 54 updates and displays the changed automatic traveling route 64 in the map field 71. In a case where the reference line 63 is set when a side of the target outline is equal to or more than a predetermined side length threshold, if the reference line 63 is changed by changing the side length threshold in response to a setting operation, the display control unit 54 updates and displays, in the map field 71, the automatic traveling route 64 that has been changed on the basis of the changed reference line 63.

The display control unit 54 allows the work start button 72 to be selected and operated in a case where a start condition for the automatic straight traveling is met, while disabling the work start button 72 from being selected and operated in a case where the start condition is not met. When the work start button 72 is selected and operated, the display control unit 54 sends the field information, the information about the reference line 63 and the automatic traveling route 64, as well as a start instruction to combine harvester 1. In response to the start instruction, the combine harvester 1 starts automatic straight traveling along the automatic traveling route 64.

While the combine harvester 1 is performing the automatic straight traveling, the display control unit 54 displays a work stop button (not illustrated) instead of the work start button 72 in a selectable and operable manner. When the work stop button is selected and operated, the display control unit 54 sends a stop instruction to the combine harvester 1. The combine harvester 1 ends the automatic straight traveling in response to the stop instruction. In addition, when the combine harvester 1 ends the automatic straight traveling, the display control unit 54 displays the work start button 72 instead of the work stop button.

Figure 8:
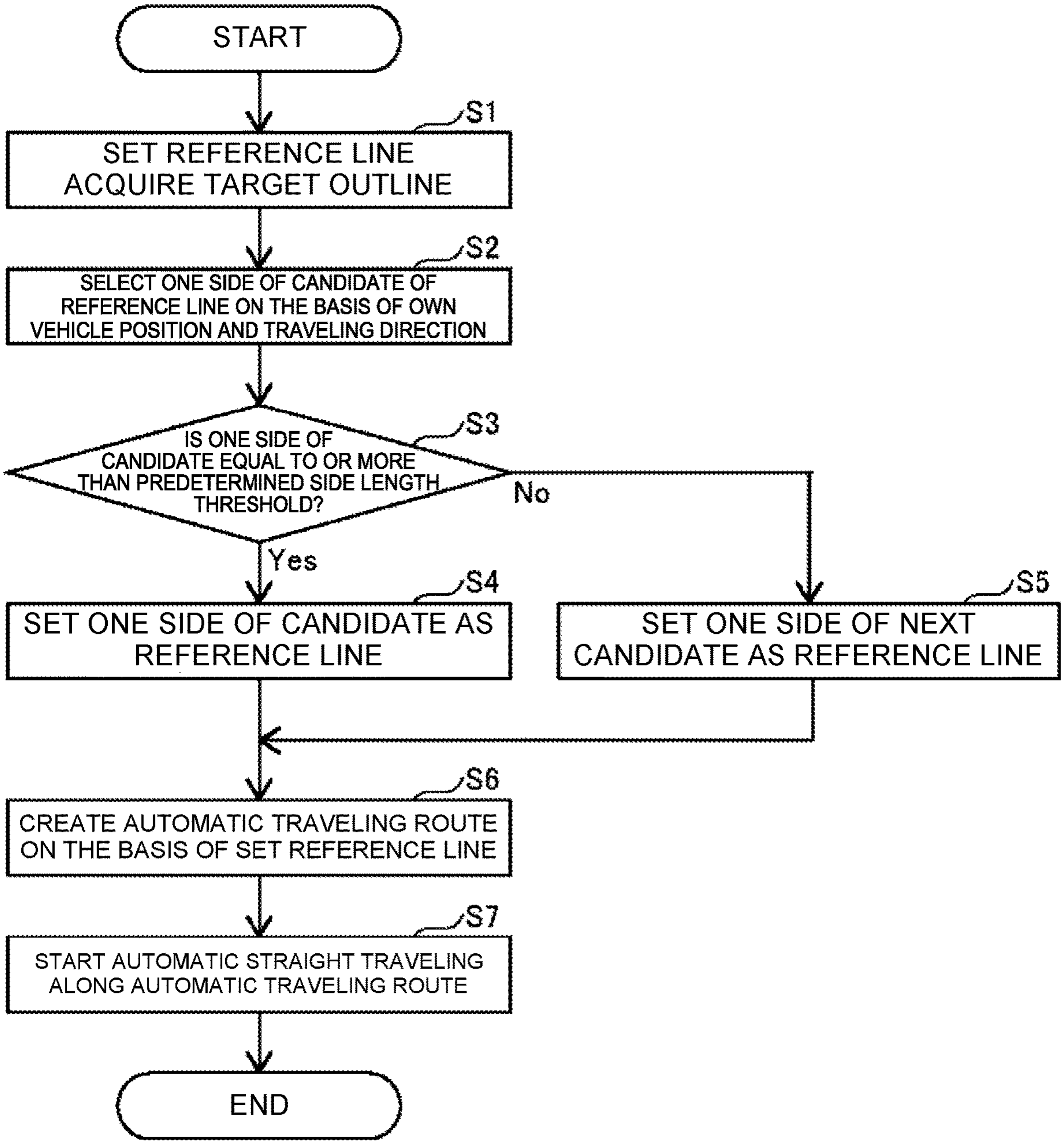
FIG. 8 is a flowchart illustrating an example of an operation of performing automatic straight traveling in the combine harvester according to the embodiment of the present invention.

An example of operation for performing the automatic straight traveling in the combine harvester 1 will be described with reference to a flowchart in FIG. 8.

First, at the portable terminal 40 of the combine harvester 1, when the field selection unit 50 selects a field as a target to be worked, the reference line setting unit 52 acquires the field outline 60 or the outline of the unworked region 61 as a target outline for setting the reference line 63 (step S1). The reference line setting unit 52 selects one side of candidate of the reference line 63 from a plurality of sides constituting the target outline on the basis of the own vehicle position and the traveling direction of the combine harvester 1 (step S2). If the one side is equal to or more than a predetermined side length threshold (step S3: Yes), the reference line setting unit 52 sets the one side as the reference line 63 (step S4). On the other hand, if the one side is less than the predetermined side length threshold (step S3: No), the reference line setting unit 52 sets one side of next candidate as the reference line 63 (step S5).

Next, the route creation unit 53 creates the automatic traveling route 64 on the basis of the reference line 63 set by the reference line setting unit 52 and sends the created automatic traveling route 64 to the combine harvester 1 (step S6). When a start instruction is sent to combine harvester 1 by operating the work start button 72 on the work screen 70 on the portable terminal 40, the automatic traveling control unit 35 in combine harvester 1 starts automatic straight traveling along the automatic traveling route 64 in response to the start instruction (step S7).

As described above, according to this embodiment, the combine harvester 1 includes the control device 30 and the portable terminal 40. The control device 30 functions as the automatic traveling control unit that performs automatic traveling on the basis of the created automatic traveling route 64. The portable terminal 40 is provided with the control device 41, and the control device 41 functions as the route creation unit 53 that creates, when the field outline 60 or the outline of the unworked region 61 is set as the target outline and one side that constitutes the target outline is set as the reference line 63, the automatic traveling route 64 as a route that is parallel to the reference line 63. The control device 41 also functions as the reference line setting unit 52 that sets, when one side that constitutes the target outline is equal to or more than a predetermined side length threshold, the one side as the reference line 63.

In other words, in the present invention, an automatic traveling method causing a work vehicle such as the combine harvester 1 to perform automatic traveling in a field comprises a route creating step of creating, when the field outline 60 or the outline of the unworked region 61 is set as a target outline and one side that constitutes the target outline is set as the reference line 63, the automatic traveling route 64 as a route that is parallel to the reference line 63, an automatic traveling step of performing automatic traveling on the basis of the created route, and a reference line setting step of setting, when the one side that constitutes the target outline is equal to or more than a predetermined side length threshold, the one side as the reference line 63.

As a result, the combine harvester 1 does not set the reference line 63 that is less than the side length threshold, and thus does not create a relatively short automatic traveling route 64 on the basis of a relatively short reference line 63. Therefore, the combine harvester 1 can create a longer automatic traveling route 64 to proceed automatic traveling smoothly, thereby improving work efficiency.

According to this embodiment, the reference line setting unit 52 functions as a threshold setting step of setting a predetermined side length threshold.

As a result, the worker can set the side length threshold to a length in accordance with the field condition or the worker's intention, and can set the reference line 63 suitable for work in the field and create the automatic traveling route 64 suitable for work in the field.

According to this embodiment, the control device 41 of the portable terminal 40 functions as the display control unit 54 that displays the target outline, and the display control unit 54 displays, among the sides constituting the target outline, a side that is equal to or more than a predetermined side length threshold and a side that is less than the predetermined side length threshold in a different display method.

As a result, the worker can check a side in the field that is equal to or more than the side length threshold and suitable for the reference line 63, and a side in the field that is less than the side length threshold and unsuitable for the reference line 63.

According to this embodiment, the control device 41 of the portable terminal 40 functions as the display control unit 54 that displays the target outline, and the display control unit 54 displays the lengths of the sides constituting the target outline.

As a result, the worker can check the length of the side to be used as the reference line 63 in the field or can set the side length threshold while checking the length of the side.

According to this embodiment, when one side, among the sides constituting the target outline, that serves as the reference line 63 is selected in response to a predetermined locking operation, the reference line setting unit 52 sets the one side as the reference line 63 even if the one side is less than the predetermined side length threshold.

As a result, the worker can set even a side that is less than the side length threshold to be the reference line 63 by a manual locking operation.

In the embodiment described above, an example is described in which the reference line setting unit 52 sets one side of the target outline that is equal to or more than a predetermined side length threshold as the reference line 63, and the route creation unit 53 creates the automatic traveling route 64 parallel to the reference line 63, regardless of the route length, but the present invention is not limited to this example.

For example, in another embodiment, the reference line setting unit 52 sets, as predetermined side length thresholds, a first side length threshold with a predetermined side length and a second side length threshold with a side length shorter than the first side length threshold, and the reference line setting unit 52 sets one side of the target outline that is equal to or more than the second side length threshold as the reference line 63, and the route creation unit 53 creates only the automatic traveling route 64 that is equal to or more than a predetermined lower limit route length when the reference line 63 is equal to or more than the second side length threshold and less than the first side length threshold.

Specifically, the reference line setting unit 52 sets, when one side selected from a plurality of sides constituting the target outline that is the field outline 60 or the outline of the unworked region 61 on the basis of the own vehicle position and the traveling direction of the combine harvester 1 is equal to or more than the second side length threshold, the one side as the reference line 63.

When the reference line 63 is equal to or more than the second side length threshold and less than the first side length threshold, the route creation unit 53 creates only the automatic traveling route 64 whose route length is equal to or more than the predetermined lower limit route length and does not create the automatic traveling route 64 whose route length is less than the predetermined lower limit route length. In addition, when the reference line 63 is equal to or more than the first side length threshold, the route creation unit 53 creates the automatic traveling route 64 regardless of the route length.

Figure 9:
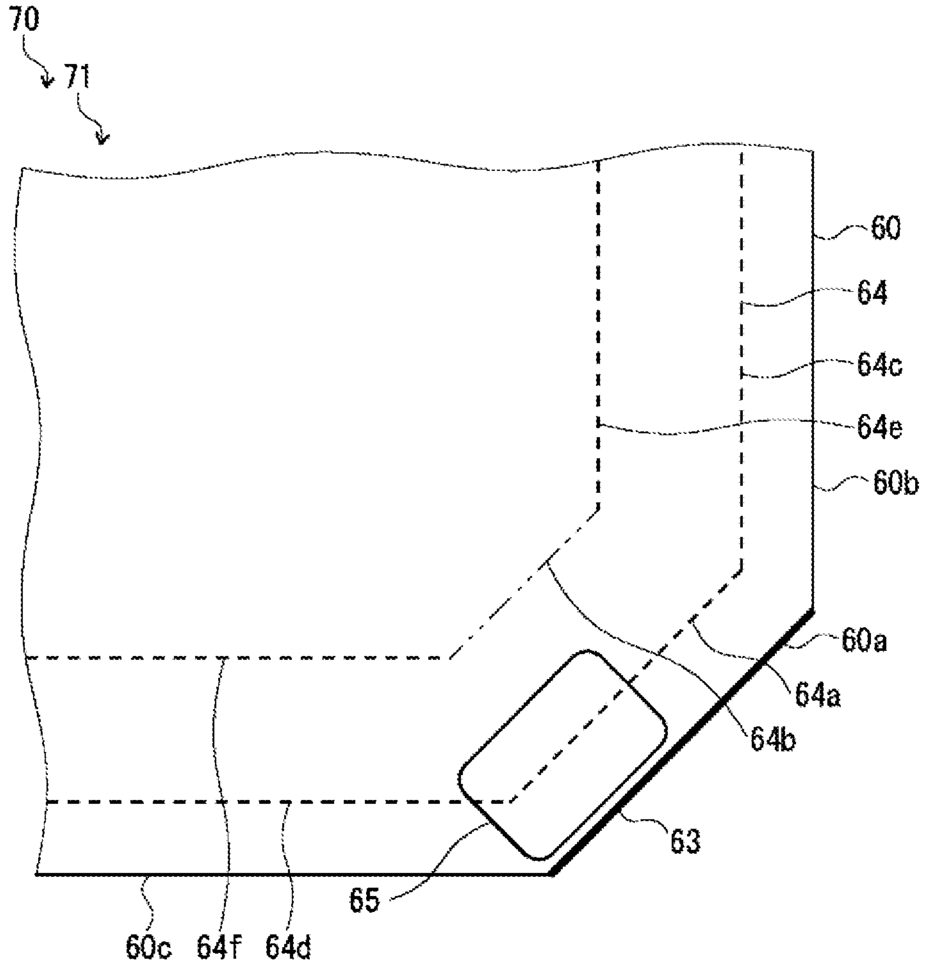
FIG. 9 is a plan view illustrating a partially enlarged example of the work screen displayed on the portable terminal of the combine harvester according to another embodiment of the present invention.

For example, when the field outline 60 is set as the target outline, as illustrated in FIG. 9, in a case where the own vehicle position of the combine harvester 1 is closer to the side 60*a* of the field outline 60 and the traveling direction of the combine harvester 1 is closer to the extending direction of the side 60*a*, the reference line setting unit 52 selects the side 60*a* as a candidate on the basis of the own vehicle position and the traveling direction. In this case, when the side 60*a* is equal to or more than the second side length threshold, the reference line setting unit 52 sets the side 60*a* as the reference line 63. In addition, FIG. 9 is a partially enlarged view of the map field 71 of the work screen 70, which displays an example in another embodiment.

Next, the route creation unit 53 creates the automatic traveling route 64 consisting of a plurality of straight routes parallel to the reference line 63 at intervals of the combine harvester 1's working width. In this case, when the reference line 63 is equal to or more than the second side length threshold and less than the first side length threshold, the route creation unit 53 creates a straight route 64*a* with a route length that is equal to or more than the predetermined lower limit route length, while not creating a straight route 64*b* with a route length that is less than the predetermined lower limit route length.

When the route creation unit 53 creates the automatic traveling route 64 using the side 60*a* and contiguous sides 60*b* and 60*c* of the field outline 60 as reference lines 63 respectively, the route creation unit 53 creates straight routes 64*c* and 64*d* before and after the straight route 64*a*, and creates straight routes 64*e* and 64*f* before and after the straight route 64*b* that is not created. In this case, the route creation unit 53 may create the automatic traveling route 64 so that the straight routes 64*c* and 64*d* are contiguous before and after the straight route 64*a*. For the straight routes 64*e* and 64*f* before and after the straight route 64*b* that is not created, the route creation unit 53 may create the automatic traveling route 64 so that the straight routes 64*e* and 64*f* are contiguous by extending the straight routes 64*e* and 64*f* until the straight routes 64*e* and 64*f* intersect with each other, but the route creation unit 53 may not have to create a route to make the straight routes 64*e* and 64*f* contiguous.

The predetermined lower limit route length may be set in advance, or may be set arbitrarily according to the worker's setting operation. The route creation unit 53 realizes a lower limit setting step of setting a predetermined lower limit route length in the automatic traveling method according to the present invention.

According to the another embodiment described above, the combine harvester 1 does not create the relatively short automatic traveling route 64, and therefore can create the longer automatic traveling route 64 to proceed automatic traveling smoothly, thereby improving work efficiency. For example, in a case where the reference line 63 that is equal to or more than the second side length threshold (equal to or more than a predetermined side length threshold) is set in the field, when the automatic traveling route 64 consisting of a plurality of straight routes parallel to the reference line 63 is created, the route lengths of the straight routes become shorter as the straight routes approach the inside of the field. However, as described above, by not creating a straight route with a route length that is less than the predetermined lower limit route length, the relatively short automatic traveling route 64 will not be created.

Figure 10:
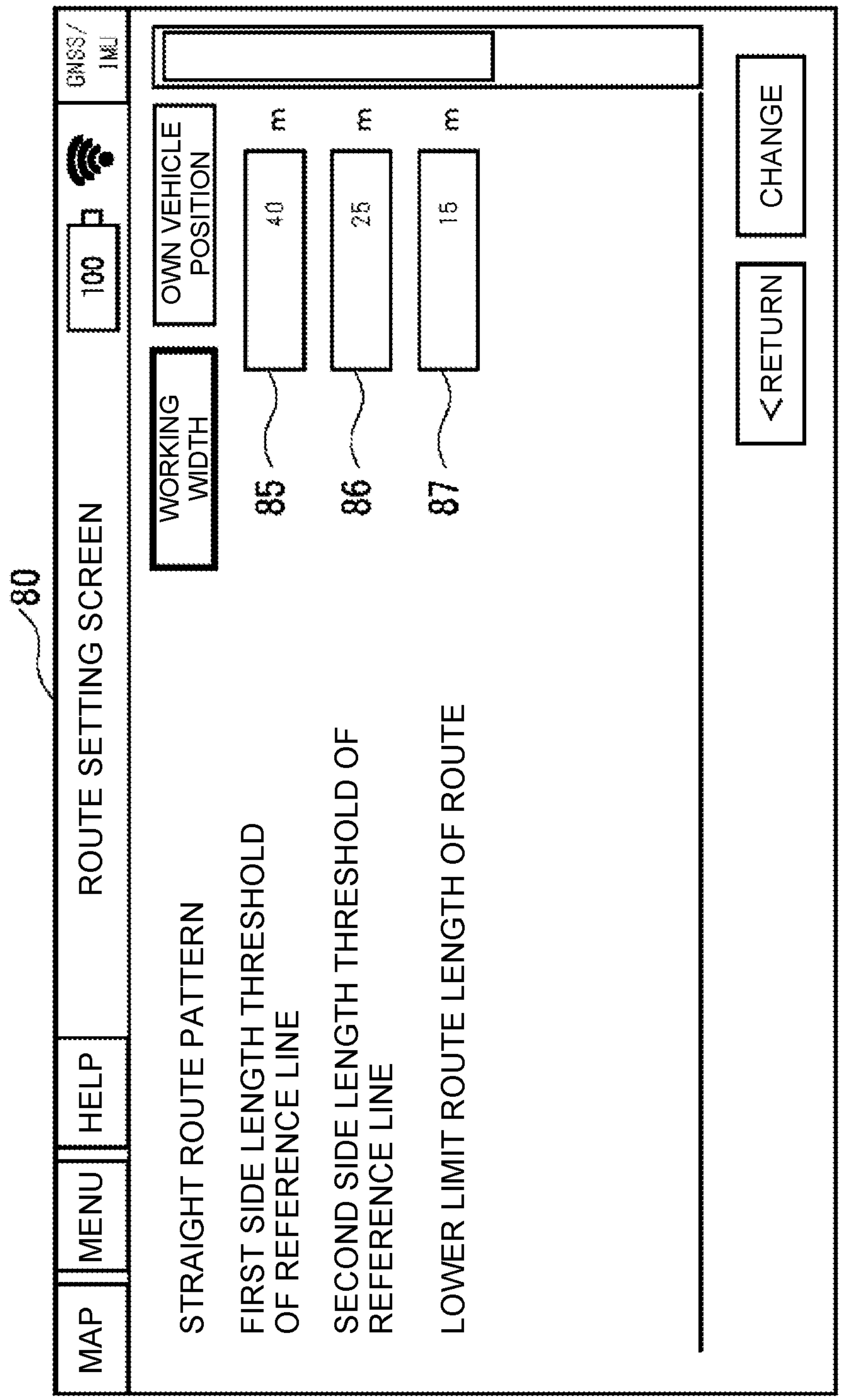
FIG. 10 is a plan view illustrating an example of the route setting screen displayed on the portable terminal of the combine harvester according to the another embodiment of the present invention.

Furthermore, in the another embodiment described above, the display control unit 54 allows first and second side length thresholds to be set and operated on the route setting screen 80 and the work screen 70. For example, as illustrated in FIG. 10, the display control unit 54 displays, on the route setting screen 80, an input field 85 to allow the first side length threshold to be input and set and an input field 86 to allow the second side length threshold to be input and set.

In addition, the display control unit 54 also allows, on the route setting screen 80 and the work screen 70, the predetermined lower limit route length to be set and operated. For example, as illustrated in FIG. 10, the display control unit 54 displays, on the route setting screen 80, an input field 87 that allows a lower limit route length to be input and set when creating the automatic traveling route 64 on the basis of the reference line 63. Alternatively, the display control unit 54 may display, inside or outside the frame of the map field 71 on the work screen 70, an input field that allows a lower limit route length to be input and set.

As a result, the worker can set the lower limit route length to a length in accordance with the field condition and the worker's intention, thereby creating the automatic traveling route 64 suitable for work in the field.

In a further embodiment, the reference line setting unit 52 automatically selects one side from a plurality of sides constituting the target outline that is the field outline 60 or the outline of the unworked region 61 on the basis of the own vehicle position and the traveling direction of the combine harvester 1, regardless of the side length, and sets the one side as the reference line 63. When the route creation unit 53 creates the automatic traveling route 64 consisting of a plurality of straight routes parallel to the reference line 63 at intervals of the combine harvester 1's working width, the route creation unit 53 creates only the automatic traveling route 64 whose route length is equal to or more than the predetermined lower limit route length, regardless of the length of the reference line 63.

For example, similar to the example described with reference to FIG. 9 in the another embodiment described above, the route creation unit 53 creates, among a plurality of straight routes parallel to the reference line 63, the straight route 64*a* with a route length that is equal to or more than the predetermined lower limit route length, while not creating the straight route 64*b* with a route length that is less than the predetermined lower limit route length.

The route creation unit 53 creates the straight routes 64*c* and 64*d* before and after the straight route 64*a*, and creates the straight routes 64*e* and 64*f* before and after the straight route 64*b* that is not created. In this case, the route creation unit 53 may create the automatic traveling route 64 so that the straight routes 64*c* and 64*d* are contiguous before and after the straight route 64*a*. For the straight routes 64*e* and 64*f* before and after the straight route 64*b* that is not created, the route creation unit 53 may create the automatic traveling route 64 so that the straight routes 64*e* and 64*f* are contiguous by extending the straight routes 64*e* and 64*f* until the straight routes 64*e* and 64*f* intersect with each other, but the route creation unit 53 may not have to create a route to make the straight routes 64*e* and 64*f* contiguous.

In the further embodiment, similar to the another embodiment, the predetermined lower limit route length may be set in advance, or may be set arbitrarily according to the worker's setting operation. The route creation unit 53 realizes a lower limit setting step of setting a predetermined lower limit route length in the automatic traveling method according to the present invention. The display control unit 54 allows a predetermined lower limit route length to be set and operated on the route setting screen 80 and the work screen 70.

In the further embodiment, the route creation unit 53 is not limited to the example of creating the automatic traveling route 64 consisting of a plurality of straight routes parallel to the reference line 63 at intervals of the combine harvester 1's working width. For example, the route creation unit 53 creates the automatic traveling route 64 in such a manner that the field outline 60 or the outline of the unworked region 61 is set as the target outline, and that automatic reaping traveling is performed in a traveling pattern of circumference reaping that repeats the circumference formed by connecting the straight routes along the inner periphery of the target outline while shifting toward the center side. Even in this case, the route creation unit 53 creates the automatic traveling route 64 so that the route length of each straight route is equal to or more than the predetermined lower limit route length.

According to the further embodiment described above, the combine harvester 1 does not create a straight route with a route length that is less than a predetermined lower limit route length, and thus does not create the relatively short automatic traveling route 64. Therefore, the combine harvester 1 can create the longer automatic traveling route 64 to proceed automatic traveling smoothly, thereby improving work efficiency.

In the above embodiments, the example of the combine harvester 1 composed of the head-feeding type combine harvester is described. However, the present invention is not limited to this example, and the combine harvester 1 may be composed of an ordinary-type combine harvester.

In the above embodiments, an example in which the work vehicle is composed of the combine harvester 1 is described, but the present invention is not limited to this example. For example, the work vehicle of the present invention may be composed of other agricultural work machine for harvesting crops, or may be composed of a work vehicle other than the agricultural work machine.

The present invention can be modified as appropriate to the extent that it does not contradict the gist or idea of the invention that can be read from the claims and the specification as a whole, and the automatic traveling method, the work vehicle and the automatic traveling method with such modifications are also included in the technical concept of the present invention.

REFERENCE SIGNS LIST

- 1: Combine harvester (work vehicle)
- 2: Traveling part
- 3: Reaping part
- 30: Control device
- 35: Automatic traveling control unit
- 40: Portable terminal
- 41: Control device
- 44: Display unit
- 50: Field selection unit
- 51: Work region determination unit
- 52: Reference line setting unit
- 53: Route creation unit
- 54: Display control unit
- 60: Field outline
- 61: Unworked region
- 63: Reference line
- 64: Automatic traveling route

The invention claimed is:

1. An automatic traveling method causing a work vehicle to perform automatic traveling in a field, the automatic traveling method comprising:

a route creating step of creating, when a field outline is set as a target outline and one side that constitutes the target outline is set as a reference line, a route that is parallel to the reference line;

an automatic traveling step of performing automatic traveling on the basis of the created route; and a reference line setting step of setting, from a plurality of sides of the target outline based on the work vehicle's position and traveling direction, one side that is located corresponding to the work vehicle's position and has an extending direction corresponding to the work vehicle's traveling direction as a candidate side for the reference line, and setting, when the candidate side equal to or more than a predetermined side length threshold, the candidate side as the reference line, wherein the predetermined side length threshold has a first side length threshold and a second side length threshold that is shorter than the first side length threshold, the reference line setting step sets the one side as a reference line when the one side is equal to or more than the second side length threshold, when the reference line is equal to or more than the second side length threshold and less than the first side length threshold, the route creating step creates only the route whose route length is equal to or more than a predetermined lower limit route length, and when the reference line is equal to or more than the first side length threshold, the route creating step creates the route regardless of the route length.

2. An automatic traveling method causing a work vehicle to perform automatic traveling in a field, the automatic traveling method comprising:

a route creating step of creating, when an outline of an unworked region of the field is set as a target outline and one side that constitutes the target outline is set as a reference line, a route that is parallel to the reference line;

an automatic traveling step of performing automatic traveling on the basis of the created route; and a reference line setting step of setting, from a plurality of sides of the target outline based on the work vehicle's position and traveling direction, one side that is located corresponding to the work vehicle's position and has an extending direction corresponding to the traveling direction as a candidate side for the reference line, and setting, when the candidate side is equal to or more than a predetermined side length threshold, the candidate side as the reference line, wherein the predetermined side length threshold has a first side length threshold and a second side length threshold that is shorter than the first side length threshold, the reference line setting step sets the one side as a reference line when the one side is equal to or more than the second side length threshold, when the reference line is equal to or more than the second side length threshold and less than the first side length threshold, the route creating step creates only the route whose route length is equal to or more than a predetermined lower limit route length, and when the reference line is equal to or more than the first side length threshold, the route creating step creates the route regardless of the route length.

3. The automatic traveling method according to claim 1, further comprising:

a threshold setting step of setting the predetermined side length threshold.

4. The automatic traveling method according to claim 1, further comprising:

a lower limit setting step of setting the predetermined lower limit route length.

5. The automatic traveling method according to claim 1, further comprising:

a displaying step of displaying the target outline, wherein the displaying step displays, among sides constituting the target outline, a side that is equal to or more than the predetermined side length threshold and a side that is less than the predetermined side length threshold in a different display method.

6. The automatic traveling method according to claim 1, further comprising:

a displaying step of displaying the target outline, wherein the displaying step displays lengths of the sides constituting the target outline.

7. The automatic traveling method according to claim 1, wherein:

when one side, among the sides constituting the target outline, that serves as the reference line is selected in response to a predetermined locking operation, the reference line setting step sets the one side as the reference line even if the one side is less than a predetermined side length threshold.

8. A work vehicle that performs automatic traveling in a field, the work vehicle comprising:

a route creation unit creating, when a field outline is set as a target outline and one side that constitutes the target outline is set as a reference line, a route that is parallel to the reference line;

an automatic traveling control unit performing automatic traveling on the basis of the created route; and a reference line setting step of setting, from a plurality of sides of the target outline based on the work vehicle's position and traveling direction, one side that is located corresponding to the work vehicle's position and has an extending direction corresponding to the traveling direction as a candidate side for the reference line, and setting, when the candidate side is equal to or more than a predetermined side length threshold, the candidate side as the reference line, wherein the predetermined side length threshold has a first side length threshold and a second side length threshold that is shorter than the first side length threshold, the reference line setting step sets the one side as a reference line when the one side is equal to or more than the second side length threshold, when the reference line is equal to or more than the second side length threshold and less than the first side length threshold, the route creating step creates only the route whose route length is equal to or more than a predetermined lower limit route length, and when the reference line is equal to or more than the first side length threshold, the route creating step creates the route regardless of the route length.

9. A work vehicle that performs automatic traveling in a field, the work vehicle comprising:

a route creation unit creating, when an outline of an unworked region of the field is set as a target outline and one side that constitutes the target outline is set as a reference line, a route that is parallel to the reference line;

an automatic traveling control unit performing automatic traveling on the basis of the created route; and a reference line setting step of setting, from a plurality of sides of the target outline based on the work vehicle's position and traveling direction, one side that is located corresponding to the work vehicle's position and has an extending direction corresponding to the traveling direction as a candidate side for the reference line, and setting, when the candidate side is equal to or more than a predetermined side length threshold, the candidate side as the reference line, wherein the predetermined side length threshold has a first side length threshold and a second side length threshold that is shorter than the first side length threshold, the reference line setting step sets the one side as a reference line when the one side is equal to or more than the second side length threshold, when the reference line is equal to or more than the second side length threshold and less than the first side length threshold, the route creating step creates only the route whose route length is equal to or more than a predetermined lower limit route length, and when the reference line is equal to or more than the first side length threshold, the route creating step creates the route regardless of the route length.

10. An automatic traveling system causing a work vehicle to perform automatic traveling in a field, the automatic traveling system comprising:

a route creation unit creating, when a field outline is set as a target outline and one side that constitutes the target outline is set as a reference line, a route that is parallel to the reference line;

an automatic traveling control unit performing automatic traveling on the basis of the created route; and a reference line setting step of setting, from a plurality of sides of the target outline based on the work vehicle's position and traveling direction, one side that is located corresponding to the work vehicle's position and has an extending direction corresponding to the traveling direction as a candidate side for the reference line, and setting, when the candidate side is equal to or more than a predetermined side length threshold, the candidate side as the reference line, wherein the predetermined side length threshold has a first side length threshold and a second side length threshold that is shorter than the first side length threshold, the reference line setting step sets the one side as a reference line when the one side is equal to or more than the second side length threshold, when the reference line is equal to or more than the second side length threshold and less than the first side length threshold, the route creating step creates only the route whose route length is equal to or more than a predetermined lower limit route length, and when the reference line is equal to or more than the first side length threshold, the route creating step creates the route regardless of the route length.

11. An automatic traveling system causing a work vehicle to perform automatic traveling in a field, the automatic traveling system comprising:

a route creation unit creating, when an outline of an unworked region of the field is set as a target outline and one side that constitutes the target outline is set as a reference line, a route that is parallel to the reference line;

an automatic traveling control unit performing automatic traveling on the basis of the created route; and a reference line setting step of setting, from a plurality of sides of the target outline based on the work vehicle's position and traveling direction, one side that is located corresponding to the work vehicle's position and has an extending direction corresponding to the traveling direction as a candidate side for the reference line, and setting, when the candidate side is equal to or more than a predetermined side length threshold, the side as the reference line, wherein the predetermined side length threshold has a first side length threshold and a second side length threshold that is shorter than the first side length threshold, the reference line setting step sets the one side as a reference line when the one side is equal to or more than the second side length threshold, when the reference line is equal to or more than the second side length threshold and less than the first side length threshold, the route creating step creates only the route whose route length is equal to or more than a predetermined lower limit route length, and when the reference line is equal to or more than the first side length threshold, the route creating step creates the route regardless of the route length.

* * * * *